No. 655,724. Patented Aug. 14, 1900.
J. LIEBAU.
TRACTION ENGINE.
(Application filed May 10, 1900.)
(No Model.) 2 Sheets—Sheet 1.

Witnesses
C. E. Hunt
J. R. Wilson

Inventor
John Liebau
by H. B. Willson & Co.
Attorneys

No. 655,724. Patented Aug. 14, 1900.
J. LIEBAU.
TRACTION ENGINE.
(Application filed May 10, 1900.)
(No Model.) 2 Sheets—Sheet 2.
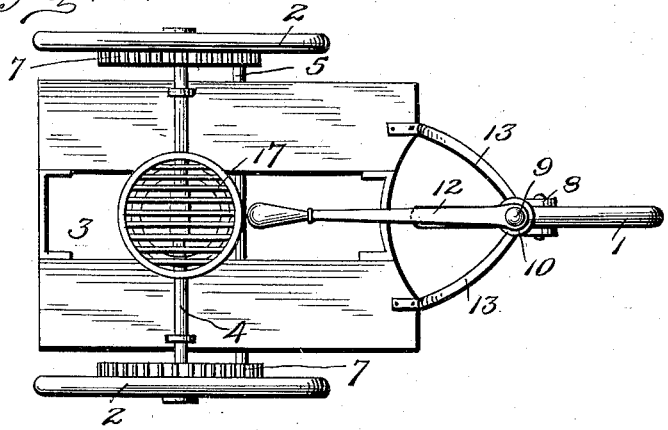
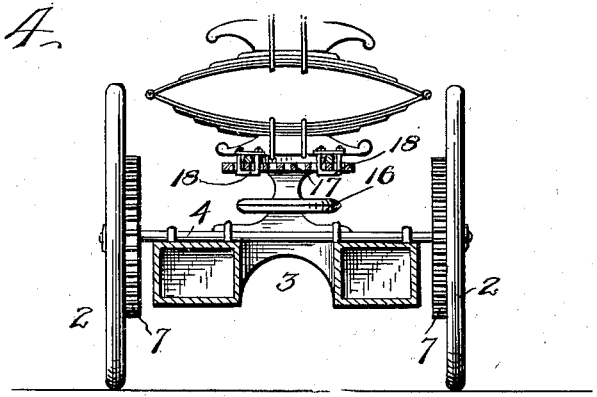
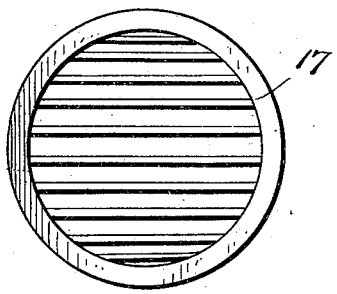
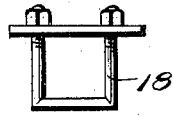
Witnesses
Inventor
John Liebau
By H. B. Willson &co.
Attorneys

UNITED STATES PATENT OFFICE.

JOHN LIEBAU, OF NEW YORK, N. Y.

TRACTION-ENGINE.

SPECIFICATION forming part of Letters Patent No. 655,724, dated August 14, 1900.

Application filed May 10, 1900. Serial No. 16,143. (No model.)

*To all whom it may concern:*

Be it known that I, JOHN LIEBAU, a citizen of the United States, residing at New York, in the county of New York and State of New York, have invented certain new and useful Improvements in Traction-Engines; and I do declare the following to be a full, clear, and exact description of the invention, such as will enable others skilled in the art to which it appertains to make and use the same.

This invention relates to traction engines or locomotives for propelling other vehicles.

The object of the invention is to provide such a device which can be easily and quickly detached from one vehicle and attached to another and which can be applied to any vehicle now in use without in any way altering the construction of the said vehicle.

With this and other objects in view the invention consists in the construction and arrangement of parts, as will be hereinafter particularly described and claimed, reference being had to the accompanying drawings, in which—

Figure 1:
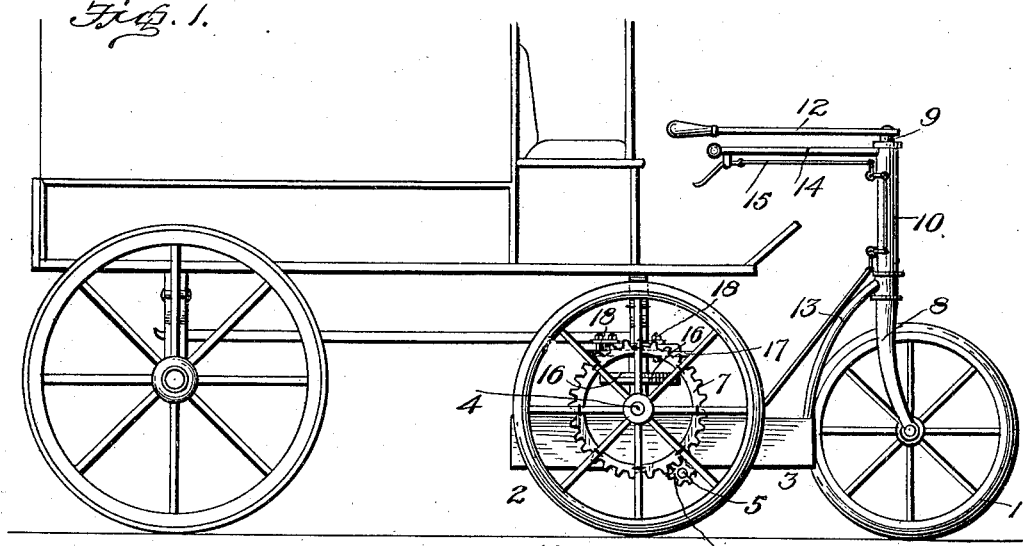
Figure 2:
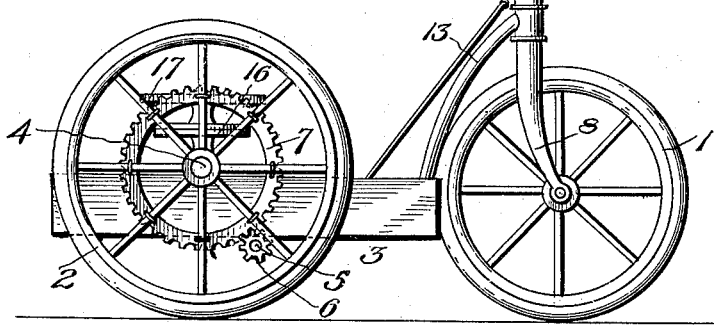
Figure 7:
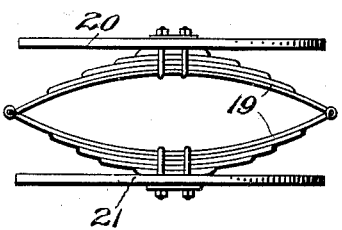

Figure 1 is a side elevation of my traction-engine, showing it attached to the vehicle. Fig. 2 is a side elevation of the engine detached from the vehicle. Fig. 3 is a top plan view of the same. Fig. 4 is a transverse vertical sectional view through the traction-engine, showing the manner of connecting the same with the vehicle. Fig. 5 is a detail view of the grating to which the fifth-wheel of a vehicle is attached. Fig. 6 is a detail view of one of the attaching-clips, and Fig. 7 is a detail view of a modified form of attaching device.

In the drawings, 1 denotes the front steering-wheel, 2 the rear supporting-wheels, and 3 the body portion, which is adapted to contain the engine or motive power, which may be of any suitable character.

4 denotes the axle of the supporting-wheels, to which the body 3 may be attached in any suitable manner, but preferably depending therefrom, as shown in the drawings.

5 denotes a transversely-disposed power-shaft, preferably, but not necessarily, supported in journals beneath the body of the vehicle and extending parallel with the axle 4.

6 denotes spur-gear pinions fixed on the ends of the shaft 5 and in mesh with spur gear-wheels 7, rigidly attached to the supporting-wheels 2 to drive the same.

The shaft 5 and axle 4 may be provided with suitable reversing and differential gears and brake mechanism. (Not shown in the drawings nor described, as they do not form a part of my present invention and the construction of which depends upon the nature of the motive power to be used.)

The shaft 5 may receive its power from the motors and transfer the same to the drive-wheels 2, as hereinbefore described, or the motors may be connected directly to the axle 4, as desired.

The steering-wheel 1 is mounted in the fork 8, the upper end of which is formed with a pintle 9, passing through the tubular head 10, and provided with the necessary steering-lever 12, which extends rearwardly within convenient reach of the operator. To the lower end of the tubular head 10 are rigidly attached downwardly - extending arms or braces 13, which serve to support the forward end of the body 3.

The upper end of the head 10 is provided with a rearwardly - extending horizontally-disposed rigid arm 14, the office of which is to support the necessary operating and controlling rods and levers 15.

16 denotes a fifth-wheel rigidly connected to the axle 4 of the traction-engine. To the upper portion of said fifth-wheel is fixed a vehicle-supporting plate 17, having, preferably, a grate-like construction. To this plate is bolted the upper section of the fifth-wheel of a vehicle by means of clips 18, the grate-like construction permitting the attachment of fifth-wheels of different sizes and shapes.

The fifth-wheels of vehicles are sometimes placed above the spring, and in that event I use a supplementary attaching device, such as shown in Fig. 7 of the drawings, consisting of a spring 19, having attached to its upper and lower members "grates" 20 and 21, the grate 21 being connected by clips to the grate 17 of the traction-engine and the grate 20 receiving, as in the former instance, the fifth-wheel of the vehicle.

In using my traction-engine the front running-gear of any ordinary vehicle is removed therefrom and the remaining member of the fifth-wheel, carried by the body of said vehicle, is placed upon the grate-like supporting-plate 17 of the traction-engine and securely attached thereto by means of the clips 18, when the vehicle is ready for use. The advantages of such a construction will be readily apparent—as, for instance, a person may use the same in connection with his business vehicle during business hours and when through with that vehicle may quickly and easily detach the traction-engine therefrom and attach it to a carriage or pleasure vehicle, it thereby serving the twofold purpose of business and pleasure.

From the foregoing description, taken in connection with the accompanying drawings, the construction and application of my device will be readily understood, and a further description of the same is not deemed necessary.

Various changes in the form, proportion, and the minor details of construction may be resorted to without departing from the principle or sacrificing any of the advantages of this invention.

Having thus described my invention, what I claim as new therein, and desire to secure by Letters Patent, is—

1. In a traction-engine, the combination of the driving-wheels and an axle therefor, a front steering-wheel, a body supported by said wheels and axle and adapted to contain a suitable motive power for propelling said traction-engine, a fifth-wheel fixed upon said axle, and a grate-like or slotted vehicle-supporting plate adapted to be attached to different sized and shaped fifth-wheels of vehicles, substantially as and for the purpose set forth.

2. In a traction-engine, the combination of the driving-wheels and an axle therefor, a body mounted on the axle and adapted to contain a suitable motive power for propelling said traction-engine, a frame having a head-tube and braces projecting from said tube and supporting the front end of the body, a steering-wheel mounted in the head-tube, and a rigid arm projecting rearwardly from the head-tube and adapted to support the necessary operating and controlling levers for said motive power, substantially as described.

In testimony whereof I have hereunto set my hand in presence of two subscribing witnesses.

JOHN LIEBAU.

Witnesses:
J. F. COFFIN,
HERMANN PRILLWITZ.